Patented Aug. 9, 1927.

1,638,548

UNITED STATES PATENT OFFICE.

CHRISTIAN K. NELSON, OF ONAWA, IOWA, ASSIGNOR TO ESKIMO PIE CORPORATION, OF CHICAGO, ILLINOIS, A CORPORATION OF DELAWARE.

CONFECTION AND PROCESS FOR MAKING CONFECTIONS.

No Drawing.   Application filed December 17, 1921.   Serial No. 523,195.

The object of my invention is to provide a complete practical and efficient commercial process for making a confection, consisting of a frozen core, such for instance as ice cream, ices or sherbets, having a hardened edible coating, such as chocolate, caramel or the like. A confection of this kind is the subject of my patent, numbered 1,404,539, and issued January 24, 1922.

A further object is to provide a new confection.

I have found that to make the product on a commercial basis, with a proper volume of production and a proper excellence of product involves numerous troublesome and difficult problems, several of which will be referred to hereafter in connection with the description of the steps of my process, which will now be somewhat fully explained.

Generally speaking, my process involves the preparation of the frozen core, the preparation of the coating material, the application of the coating, and the handling of the product after such application.

Where the core is ice cream or similar material and the coating is chocolate or similar material, I find that to get the best results, both the ice cream and the chocolate require certain conditions and handling during the entire manufacturing process.

Preparation of the frozen core.

The ice cream is made in a freezer by ordinary processes, with an agitator. I preferably use more binder or stabilizer than is usual for the ice cream, such for instance as gelatine or other products adapted for this purpose, so that the ice cream will stand up better and will not melt so quickly.

Ice cream comes from the freezer in a semi-liquid or mushy state and is put into mould pans or other receptacles which may be of any desired size and shape.

It cannot be coated in the condition in which it comes from the freezer, because it is too soft to handle, melts too easily and gives off too much moisture to be at all practical.

The next step, therefore, is to freeze and harden the ice cream by subjecting it to a temperature below freezing till it becomes thoroughly frozen. This is usually done by placing it in an artificially cooled room. It is then taken out and cut or formed to the proper size and shape to form the core of the confection. It may be cut to form bars or other desired shapes.

The ice cream should then be again subjected to a temperature below freezing. If it is coated after the cutting and before being frozen again, it may be too slick and the coating will not adhere properly, and the ice cream will melt a little more during and after coating than it should. After the second freezing the ice cream is taken from the cold room and dipped or otherwise coated.

Preparation of the coating.

Where chocolate is used for the coating, I prefer a chocolate having a high butter fat content. The chocolate is mixed and melted with cocoa butter or cocoanut butter in approximately the proportions of twenty to three. The latter ingredient, cocoa butter or cocoanut butter, is for thinning, and, with the butter fat, makes a more liquid and thinner mixture, which runs freely and has a lower melting point than ordinary coating chocolate, and hardens very rapidly after the hardening process once begins.

The mixture is melted at a temperature of near 115 degrees F., preferably just below that point, usually in water jacketed kettles. It is then cooled to approximately 86 degrees, and held there during the dipping process. The mixture should be agitated constantly after it liquefies until the coating is applied to the core.

Coating the core.

The coating may be done by dipping by hand. When it is thus done I preferably use a wire hook having at one end a portion adapted to be forced into the ice cream and at the other end a handle or loop or the like adapted to hang on a hook or nail. The ice cream should be dipped while hard and cold, immediately after coming from the cold room, without being touched by the hands of the operators.

The coated product is then drained by hanging the wire hook on any proper support. The dipping or coating and the draining should preferably be done in a room at a medium temperature, preferably about 66 degrees F.

As soon as the coating hardens enough to permit handling, the hook is removed and the holes closed by pressure with the fingers, and the product is wrapped and again subjected to and kept at a temperature below freezing.

The cores may be coated by a machine such as the enrobing machine. Where thus coated, the process is preferably as follows:

The ice cream bars or the like are placed on a wire belt or the like and are subjected to a flow of coating mixture from below, whereby they are "bottomed". The belt then travels a short distance to permit draining and then discharges the "bottomed" cores upon a smooth surfaced belt, which may be cooled by cold water or brine circulating in an enclosed slab over which this belt travels. This belt carries them a short distance and discharges them upon another wire belt or the like, where the tops and sides are subjected to flow of the coating mixture. The product travels a short distance on the wire belt for draining, and is then delivered to a smooth belt to permit the coating to harden till the product can be wrapped and sent to the cold room.

The part of the process performed on the machine can be varied considerably. The coating should be applied and draining and hardening permitted in some way to prevent the product from sticking to the machine.

I have had great difficulty in successfully dipping ice cream cores in baskets, because the chocolate hardens and sticks to the basket and not only makes it difficult to get the product out of the basket, but breaks the coating from the bar or core.

My process may be practiced with various materials, some of which will be mentioned herein.

The frozen core may be ice cream, ices, sherbets or various other products or materials. The coating may be of various ingredients, but should harden when applied and keep while cold, without deterioration for a considerable time, and should be of such quality and so prepared and applied that neither the core nor the coating are injured by the process.

The process may be practiced with a considerable variation in the use of the different steps and some of the steps may be eliminated without entire failure, but I will now explain some of the reasons for and the importance of the various steps above outlined. This explanation will bring out some of the difficulties involved in successfully coating a frozen product.

I contemplate making the ice cream by the usual process wherein it comes from the freezer, after freezing with agitation, in a semi-liquid or mushy state. It cannot then be eaten or handled for coating. The next step therefore is to send it to the cold room or otherwise subject it to temperature below freezing, so that it may harden in the pans or moulds. It is then taken out and cut or otherwise reduced to cores of desired size and shape. Usually it is cut with knives.

It must then be frozen again. If it begins to liquefy even on the surface, or if it is left with a slick surface, by the knives or otherwise, the coating will not stick properly. Furthermore, a little moisture will be communicated by each core to the coating mixture and will spoil it. The core may also transmit enough moisture to its own coating to spoil that. Dipping with the fingers, moistens and smooths the ice cream core and is therefore undesirable.

It is important that the surface of the ice cream should give off no moisture when coated. The desirable result is contributed to in several ways. The thorough freezing before coating is very important. The use of the additional binder in the ice cream formula is of value. The use of hooks or mechanical means for supporting the cores while the coating is being applied contributes to the same desirable result. The use of a coating having a low melting point is of importance and will be here referred to.

The chocolate has a high butterfat content, and is thinned with cocoa butter or cocoanut butter for several reasons. The coating mixture will run and drain more freely. It melts and hardens at lower temperature points and hardens very rapidly after hardening begins.

The coating mixture should be thin and run freely, so that it may readily drain off properly after being applied. A thin coating hardens more rapidly and thus permits the handling of the product sooner after the application, than is the case with a thick coating. The inner surface of the coating hardens very quickly after application and it is desirable that the entire coating should harden soon, in order to permit the further handling of the product before the ice cream begins to melt to any appreciable extent. The coating should harden and the product be wrapped and then placed in the cold room again preferably within fifteen minutes after dipping. If a thick coating is used, the inner part will harden quickly and the outer part may remain soft for so long that the product cannot be handled till the ice cream begins to melt or soften.

The ice cream can be left in a room at medium temperature for only a short time or it will melt enough to transmit moisture to the coating and spoil it.

The free running coating permits the product to drain quickly and leaves a coating which hardens quickly enough to permit handling the product before the ice cream begins to melt.

The addition of ingredients to the coating which lower its melting point is important.

Such a coating may be applied at nearer the temperature of the core, and will be less likely to melt it. The least amount of heat is transmitted to the ice cream and it is easier to bring the core and coating to a common mean temperature. Such a coating is not brittle when eaten and dissolves readily in the mouth at body temperature, especially if thin.

Where a thin coating is permitted to drain properly where supported on a hook or the like, there is no formation of undesirable feet such as sometimes are found on chocolate candy, which has been placed on a flat surface to permit its coating to harden.

After the dipping, the product must be kept subject to a medium temperature not far from that of the dipping mixture until the coating has first cooled from the inside for another reason. It must not be frozen from the outside immediately after dipping. When chocolate, after it has been melted and applied as a coating, is subjected promptly to a much lower temperature, the outer surface turns gray, possibly because the oil in the mixture comes to the surface. A gray chocolate is unsalable. I find, however, that by leaving the coated product in a room under medium temperature, so that the inner surface of the coating cools faster than the outer surface, the outer surface does not turn gray. It is also necessary to leave the product in a medium temperature for a short time after the application of the coating, so that the coating may harden enough to permit wrapping. If the product is put in the cold room at once after dipping and without wrapping, it will gather moisture and will discolor and spoil the chocolate for commercial purposes.

Where my process is used, the chocolate coating takes the fine gloss so desirable commercially in a chocolate coated product.

I preferably use a foil wrapper, lined with waterproof paper.

While I have explained my process with special reference to its practice with ice cream and chocolate coating, it is obvious that ices, sherbets and other cores may be used when frozen.

A great variety of coatings also may be used. For example, a cocoa butter coating without the chocolate flavor, and with or without other flavorings and colorings may be used. Gelatinous coatings may be employed as well as coatings of the syrup type, rolled in or covered with cocoanut flakes or nuts or the like.

The coating may be put on in two applications if desired. For instance a gelatinous coating may be put on and later another coating, perhaps oleaginous, like chocolate.

It will thus be seen that the coating may be given a great variety of flavors and have a great variety of ingredients.

Ordinarily after the last freezing, the product is placed in packers or kept in cold boxes or refrigerators till ready for use. When kept frozen it may be kept a long time. Even if unwrapped and exposed to the air, it will not melt for several hours, even on a warm day, since the chocolate provides a non-heat conducting coat for the ice cream and the ice cream keeps the chocolate hard.

I claim as my invention:

1. A process of manufacturing a confection which comprises freezing a normally liquid edible material to a substantially solid state and covering the frozen material with an edible form retaining and form sustaining casing.

2. A process of manufacturing a confection as described in claim 1, and which includes the steps of forming the normally liquid material when in a substantially solid state into parallelepiped block preliminary to covering.

3. A process of making a confection as described in claim 1, which includes the step of forming the casing of a plurality of coatings.

4. A process of making a confection as described in claim 1, which includes the step of applying to the frozen material an edible coating adapted to harden when subjected to reduced temperature whereby to retain its form and to sustain the original form of the frozen material.

5. A process of making a confection as described in claim 1, and wherein the material of the coating is selected so as to be capable of dissolving substantially simultaneously with the core material when taken with such core into the mouth of a consumer.

6. A process of making a confection as described in claim 1, and which includes the step of mixing milk chocolate and cocoa butter to form the coating.

7. A confection made in accordance with the process set forth in claim 1, and which comprises a core of normally liquid material frozen to a substantially solid state, and a casing of coatings therefor, one coating being applied to the core and the other coating surrounding the first applied coating.

8. The method of coating frozen articles of the character referred to, which consists in first applying an edible insulator thereto, and then enrobing the article with a coating.

9. The method of coating frozen articles of the character referred to, which consists in first applying a moisture retarding substance to a surface of the article and then enrobing the article with an edible coating applied directly over said moisture retarding substance.

10. The method of coating frozen articles of the character referred to, which consists in first applying an edible insulator thereto, and then enrobing the article with a chocolate coating.

11. A confection comprising a body of ice cream treated to prevent escape of moisture, and an enclosing coat of chocolate whereby to maintain the confection in its original form during handling.

12. A confection comprising a body of capsulated normally liquid frozen material enclosed within a coat of hardened chocolate.

13. The process of preparing a confection which consists in subjecting a quantity of material to refrigeration until frozen into a substantially solid body or form, and then applying thereto an edible enclosing envelope sealing and maintaining the frozen substance in its given frozen form.

14. The process of preparing a confection which consists in subjecting a quantity of material to refrigeration until frozen into a substantially solid body or form, then introducing said body into a liquid coating substance capable of solidifying upon contact with the frozen material and forming a non-sticky enclosing envelope for retaining the body in its given form permitting the confection to be taken in the fingers and eaten out of hand as a confection.

15. The process of preparing a confection which consists in subjecting a quantity of material to refrigeration until frozen into a substantially solid body or form, then applying thereto an edible enclosing envelope forming a part of the confection to be eaten therewith and adapted to maintain the frozen material in its given form, and finally placing thereon a removable wrapper.

16. The process of preparing a confection which consists in subjecting a quantity of material to refrigeration until frozen into a substantially solid body or form, applying thereto an edible insulating coating, and then overcoating said insulating coating with a non-sticky flavoring coating.

17. The process of preparing a confection which consists in subjecting a quantity of material to refrigeration until frozen into a substantially solid body or form, applying thereto an edible coating of a substance capable of forming an enclosing envelope for the frozen material to prevent escape of the moisture, and overcoating said material with hardened chocolate.

18. A confection comprising a body of normally liquid material frozen to a substantially solid state and sealed in an edible coating of a character capable of retaining the material in its original frozen form, and an overcoat of hardened chocolate.

19. A confection comprising a body of normally liquid material frozen to a substantially solid state, and an edible enclosing envelope encasing the frozen material to sustain and retain its form, said envelope consisting of an outer layer of chocolate and an inner insulating coat surrounding the frozen material.

20. The method of coating frozen articles of the character referred to, which consists in first protecting its supporting surface with an edible substance to hold the moisture in the article, subjecting the article and its protecting substance to an enrobing coating therefor, and finally freezing the coated article, whereby to freeze the contiguous surfaces of the article and coating together.

21. A process of manufacturing a confection which comprises freezing a normally liquid edible material to a substantially solid state and covering the frozen material with a form retaining and form sustaining coating comprising an admixture of chocolate and cocoanut butter.

22. The method of coating frozen articles of the character referred to, which consists in first applying a moisture retarding substance to a surface of the article, and then enrobing the article with a coating applied directly over said moisture retarding substance.

23. The method of coating frozen articles of the character referred to, which consists in first applying an edible insulator thereto, and then enrobing the article with a chocolate coating.

Des Moines, Iowa, November 18, 1921.

CHRISTIAN K. NELSON.